United States Patent
Edwards et al.

(10) Patent No.: US 7,314,647 B1
(45) Date of Patent: Jan. 1, 2008

(54) HEAT CURING AND SUBSEQUENT CALENDERING TO PRODUCE MAGNETIC RECORDING MEDIA

(75) Inventors: Bruce H. Edwards, White Bear Lake, MN (US); Roger J. Mandt, Stillwater, MN (US); David J. Owen, Woodbury, MN (US); Brian D. Brong, Oakdale, MN (US); Nang T. Tran, Lake Elmo, MN (US); Douglas G. Pedrotty, Baldwin, WI (US)

(73) Assignee: Imation Corp., Oakdale, MN (US)

( * ) Notice: Subject to any disclaimer, the term of this patent is extended or adjusted under 35 U.S.C. 154(b) by 832 days.

(21) Appl. No.: 10/393,211

(22) Filed: Mar. 20, 2003

(51) Int. Cl.
*B05D 5/12* (2006.01)

(52) U.S. Cl. ............ 427/127; 427/128; 427/130; 427/177; 427/359; 427/366; 427/369; 427/209

(58) Field of Classification Search ........ 427/127, 427/128, 130, 177, 359, 366, 369, 370, 209
See application file for complete search history.

(56) References Cited

U.S. PATENT DOCUMENTS

| | | | |
|---|---|---|---|
| 4,698,701 A | 10/1987 | Gantzhorn, Jr. et al. | |
| 5,510,169 A | 4/1996 | Greczyna et al. | |
| 5,607,747 A | 3/1997 | Law et al. | |
| 5,686,013 A | 11/1997 | Rustad | |
| 5,686,142 A | 11/1997 | Wallack et al. | |
| 5,738,007 A * | 4/1998 | Roerig et al. | 100/327 |
| 5,870,924 A | 2/1999 | Fahimi et al. | |
| 6,007,896 A * | 12/1999 | Bhushan | 428/834 |
| 6,030,695 A | 2/2000 | Ohkubo et al. | |
| 6,099,895 A * | 8/2000 | Mayo et al. | 427/128 |
| 6,194,058 B1 | 2/2001 | Isobe et al. | |
| 6,295,181 B1 | 9/2001 | Fahimi et al. | |
| 6,485,795 B2 * | 11/2002 | Takahashi et al. | 427/557 |
| 6,531,230 B1 * | 3/2003 | Weber et al. | 428/480 |
| 2002/0086183 A1* | 7/2002 | Misawa | 428/694 BA |
| 2002/0102439 A1 | 8/2002 | Kurose et al. | |

* cited by examiner

*Primary Examiner*—Alain L. Bashore
(74) *Attorney, Agent, or Firm*—Eric D. Levinson

(57) ABSTRACT

A method for producing a magnetic recording medium includes heat-curing a coated substrate to cure a non-magnetic back coat on the substrate and to cure a magnetic front coat on the substrate, and calendering the heat-cured coated substrate to produce the magnetic recording medium. The calendering optionally is off-line calendering during which the substrate passes between opposed, generally non-compliant rolls. Other methods, and magnetic recording media produced by the disclosed methods, also are disclosed.

18 Claims, 4 Drawing Sheets

HEAT CURING AND SUBSEQUENT CALENDERING TO PRODUCE MAGNETIC RECORDING MEDIA

BACKGROUND OF THE INVENTION

Magnetic recording media, such as data cartridge tapes, videotapes, audio tapes, other magnetic recording tapes, floppy discs, etc., enjoy wide use and popularity. Such media have evolved to provide increased recording density or capacity per unit volume, reduced average surface roughness and surface-roughness variability, reduced electromagnetic amplitude degradation caused by roughness and other factors, and increased reliability, as measured by, e.g., read- and write-error rates over extended periods of use. Wind characteristics for magnetic tape are also becoming more and more critical with the advent of narrower data tracks and thinner tape constructions. Data-cartridge formats are among the more challenging formats for wind quality, due to the high tape transport speeds and the absence of reel flanges, for example.

Magnetic recording media generally include a magnetic layer coated onto at least one side of a non-magnetic substrate, e.g., a film in the case of magnetic recording tape applications. The magnetic layer includes magnetic pigment dispersed in a polymeric binder. The magnetic layer also optionally includes other components, such as lubricants, abrasives, thermal stabilizers, catalysts, crosslinkers, antioxidants, dispersants, wetting agents, fungicides, bactericides, surfactants, antistatic agents, nonmagnetic pigments, coating aids, and the like.

With certain designs, the magnetic coating (or "front coating") is formed as a single layer. In an effort to reduce thickness of the magnetic recording layer, a more recent approach is to form the front coating in a dual layer construction, including a support layer (or "lower layer") on the substrate and a reduced-thickness magnetic layer (or "upper layer") formed directly on the support or lower layer. With this construction, the lower layer is generally non-magnetic and is comprised of a non-magnetic powder and a binder. Conversely, the upper layer comprises a magnetic metal particle powder or pigment dispersed in a polymeric binder.

A backside coating, or "back coat", is applied to the other side of the non-magnetic substrate, e.g., to improve the durability, conductivity, and tracking characteristics of the media. The backside coating also optionally includes a polymeric binder and one or more of the components listed above. The backside coating is generally formulated so as to impart both conductivity and runability to the media. Conductivity is accomplished through the use of conductive carbon in the back coat formulation. One method of imparting runability has been to formulate the back coat so as to be substantially rougher than the magnetic coating, thus allowing for stable tape pack formation during winding of the tape.

It is known in the art to calendar the media during its manufacture, e.g., to pass it through a series of opposed rollers before winding it into a roll, to improve surface smoothness. It is also known in the art to heat soak magnetic tape in wound form, after the coating and calendering processes, to "cure" the tape's coatings and increase the glass transition temperatures of the binder matrices. After the curing is complete, the tape is converted for use in cartridges.

Back coats have been formulated to be very smooth, but with a relatively low concentration of a texture particle to facilitate tape handling. However, during the heat soaking process described above, the texture particles tend to emboss into the magnetic side of the tape, which leads to the formation of "pits" in the magnetic coating. This embossing becomes more pronounced on progressing from the outside to the inside of the roll, due to the increased pressures experienced toward the core of the roll. These pits result in substantial nonuniformity in the magnetic surface and hence degrade its recording properties, particularly at the high densities required for advanced recording tapes.

SUMMARY OF THE INVENTION

According to embodiments of the invention, a method for producing a magnetic recording medium includes heat-curing a coated substrate to cure a non-magnetic back coat on the substrate and to cure a magnetic front coat on the substrate, and calendering the heat-cured coated substrate to produce the magnetic recording medium. The heat-curing optionally includes heat soaking the coated substrate, e.g., immersing the coated substrate at an immersion temperature in the range of about 50° C. to about 60° C. The method optionally includes winding the coated substrate into a roll, and the heat-curing includes heat-curing the roll. The non-magnetic back coat and magnetic front coat are dried before the heat-curing, and the curing of the non-magnetic back coat, and the curing of the magnetic front coating occur generally simultaneously, according to embodiments of the invention. Calendering occurs at a calendering temperature of between about 80° C. and about 95° C., for example. The calendering includes passing the substrate between opposed, generally non-compliant rolls, and optionally further includes calendering the substrate between additional opposed rolls, and at least one of the additional opposed rolls may be generally compliant. The calendering includes off-line calendering, and additionally may include in-line calendering, and may use at least one generally compliant roll, prior to the heat-curing, according to embodiments of the invention. The heat-curing before calendering generally eliminates or generally reduces embossing of the magnetic front coat by the non-magnetic back coat, generally reduces a block error rate of the magnetic recording medium, generally reduces surface mean peak-to-valley height $R_z$ of the magnetic front coat, generally reduces air bleed of the non-magnetic back coat, and/or generally improves wind quality of the magnetic recording medium.

According to additional embodiments of the invention, a magnetic recording medium is produced by a method that includes heat-curing a coated substrate to cure a non-magnetic back coat on the substrate, and to cure a magnetic front coat on the substrate, and calendering the heat-cured coated substrate to produce the magnetic recording medium. After calendering, the magnetic front coat is generally free of embossing by the non-magnetic back coat. The magnetic front coat includes load-bearing particles, and, after calendering, the load-bearing particles are maintained generally entirely at the surface of the magnetic front coat. Surface mean peak-to-valley height $R_z$ of the magnetic front coat is reduced due to the heat-curing before calendering, according to embodiments of the invention.

Other features and aspects according to embodiments of the invention will be apparent from the remainder of this disclosure.

DETAILED DESCRIPTION OF PREFERRED EMBODIMENTS

According to embodiments of the invention, heat soaking or other heat-curing of a coated roll occurs prior to the final calendering process. Embossing by the back coat of magnetic tape or other magnetic recording media is generally reduced or eliminated, while the benefits of calendering are maintained. Another advantage of heat-curing before calendering involves "locking-in" of the magnetic coating's load-bearing particles at the surface of the media so as to improve its tribology. Fewer load-bearing particles thus are required to achieve equivalent tribological performance, and a number of these particles can be replaced with magnetic pigment, thereby increasing the overall magnetic moment of the magnetic layer. With conventional processes of heat soaking after calendering, on the other hand, load-bearing particles are pressed subsurface during the calendering of the uncured media. Heat-curing prior to calendering is also shown to exhibit improved back coat air bleed (as a measure of surface roughness), superior wind quality, and other advantages.

Figure 1:
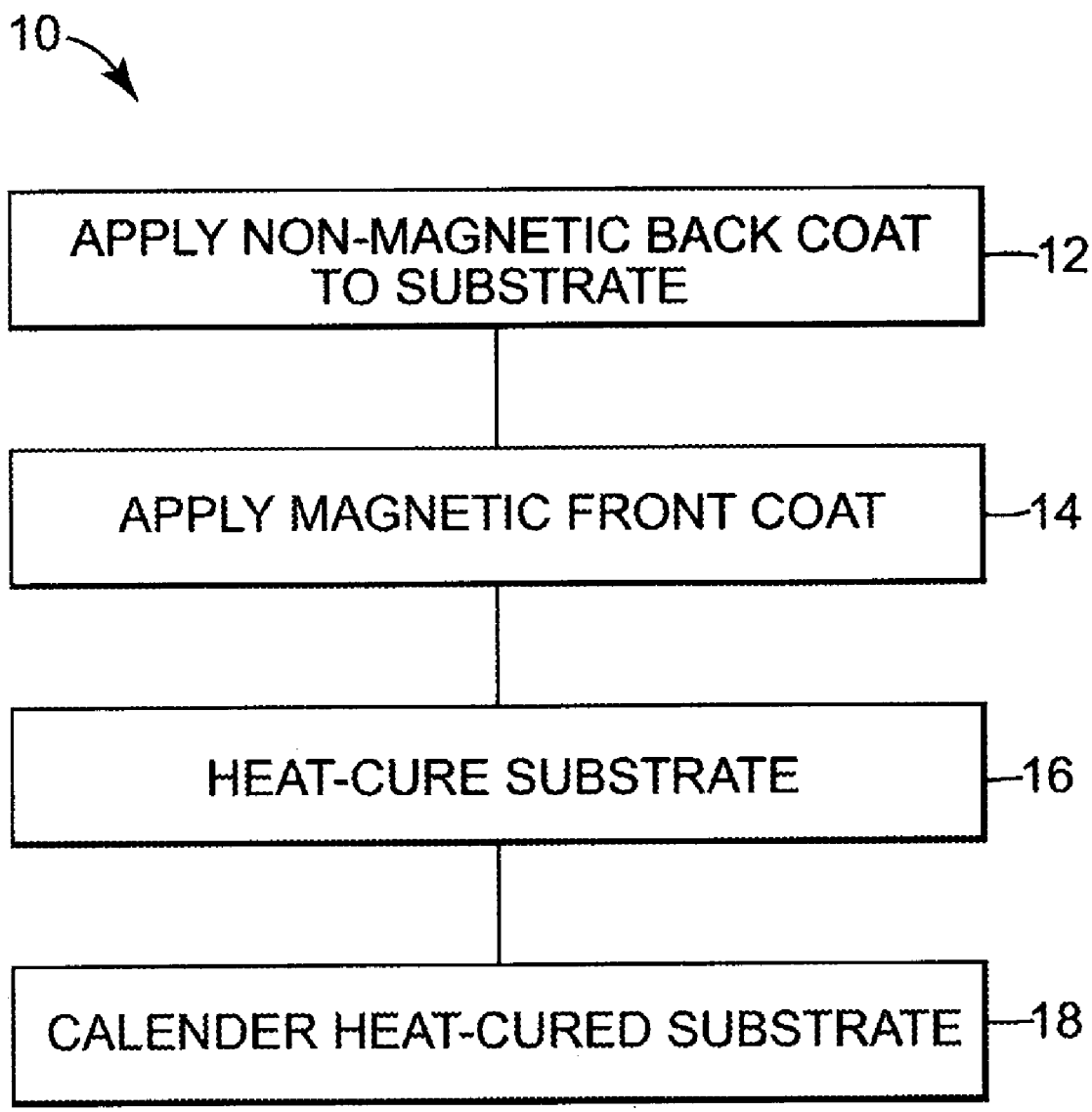
FIG. 1 is a flow chart schematically illustrating a method of producing a magnetic recording medium, according to an embodiment of the invention.

As shown in FIG. 1, method 10 of producing a magnetic recording medium according to an embodiment of the invention includes applying a non-magnetic back coat to a substrate, at 12, and applying a magnetic front coat to the substrate, at 14. Although FIG. 1 illustrates the back coating process 12 as occurring before the front coating process 14, this order can be reversed if desired. In addition, any support layers can be applied prior to or simultaneously with the coating of the magnetic layer. Heat-curing of the substrate occurs at 16, to cure the non-magnetic back coat, the magnetic front coat and any support layers on the substrate generally simultaneously, for example. Heat-curing 16 optionally includes heat soaking the coated substrate, e.g., immersing the coated substrate in roll form at an immersion temperature in the range of about 50° C. to about 60° C. Calendering the heat-cured substrate occurs at 18, e.g., at a calendering temperature of between about 80° C. and about 95° C. Calendering 18 also optionally includes passing the substrate between opposed, generally non-compliant rolls, in, e.g., a steel-on-steel (SOS) calendering process.

Figure 2:
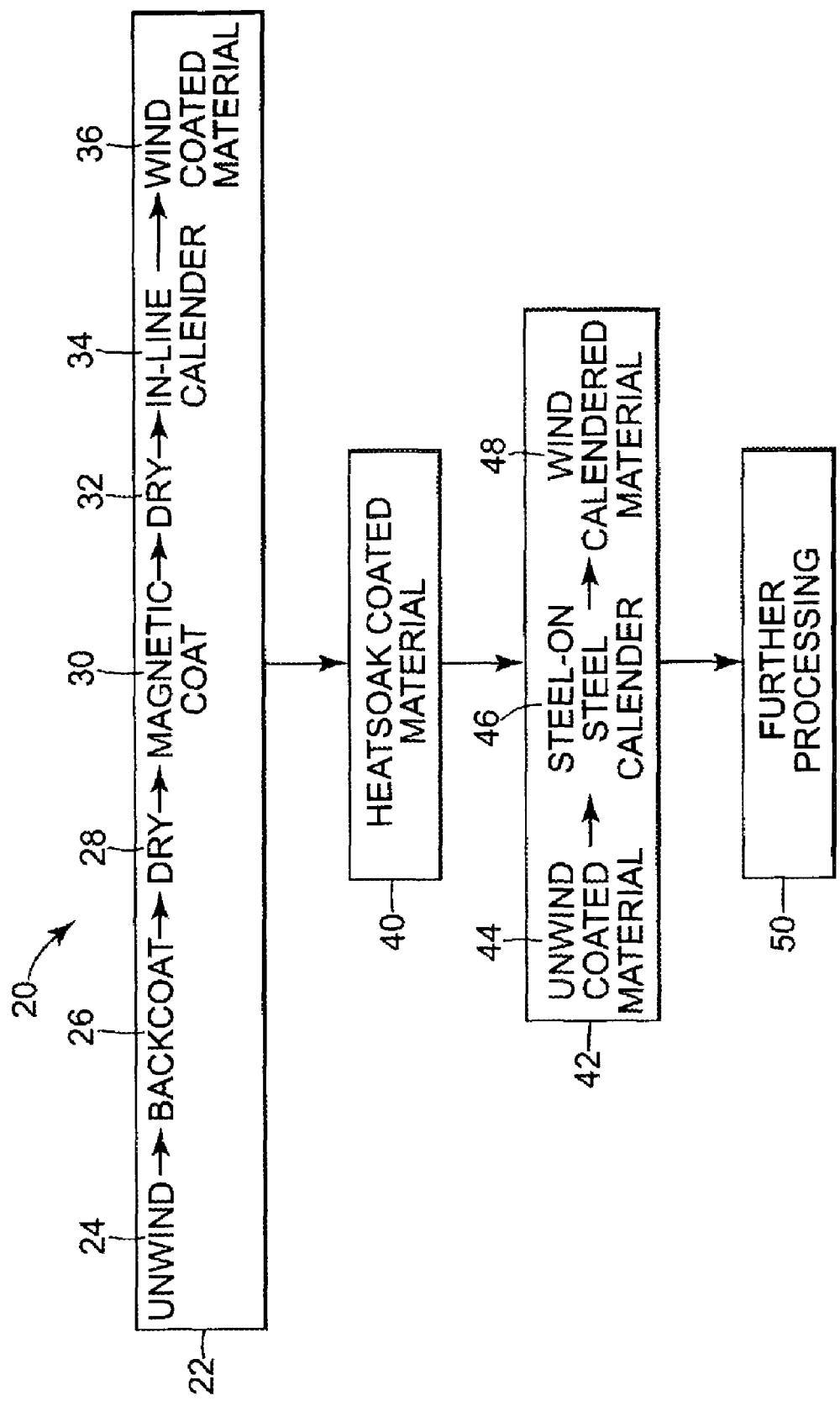
FIG. 2 is a flow chart schematically illustrating a more specific method of producing a magnetic recording medium, according an embodiment of the invention.

FIG. 2 illustrates a more specific method 20 of producing a magnetic recording medium, according to an embodiment of the invention. Method 20 includes in-line portion 22, which occurs all in the same manufacturing line. Portion 22 includes optionally unwinding, at 24, a non-magnetic substrate or other material from a spool or supply. Back coating of the substrate occurs at 26, during which a backside coating is applied to one side of the substrate. The backside coating optionally includes a polymeric binder and one or more other components to, e.g., improve the durability, conductivity, and tracking characteristics of the media. Drying of the backside coating occurs at 28. A magnetic coating is applied to the substrate, at 30. The magnetic coating is of single-layer, dual-layer, or other construction, and optionally includes magnetic pigment dispersed in a polymeric binder and one or more other components to produce desired properties. Magnetic coating 30 (i.e., front coating) optionally occurs prior to back coating 26, as referenced earlier. The magnetic coating is dried, at 32.

Method 20 optionally includes in-line calendering of the coated substrate, at 34. According to one embodiment, in-line calendering 34 uses one or more in-line nip stations, in each of which a steel or other generally non-compliant roll contacts or otherwise is applied to the magnetically coated side of the substrate, and a rubberized or other generally compliant roll contacts or otherwise is applied to the back coated side of the substrate. The generally non-compliant roll provides a desired degree of smoothness to the magnetically coated side of the substrate. Calendering 34 thus is compliant-on-steel (COS) calendering, according to one example. Alternately, in-line calendering 34 is SOS or otherwise employs one or more nip stations each having generally non-compliant rolls. After in-line calendering 34, or after drying 32 if in-line calendering is absent, the substrate or other material is wound, at 36. Heat soaking or other heat curing 40 of the coated material then occurs, e.g., in the manner described with respect to FIG. 1, to cure the non-magnetic back coat and the magnetic front coat.

Process 20 then proceeds to off-line portion 42, which occurs off the manufacturing or production line associated with in-line portion 22. Off-line portion 42 optionally occurs at another machine or location, for example. The coated substrate is unwound, at 44, and then is calendered, at 46. Calendering 46 optionally includes passing the coated substrate through a series of generally non-compliant rolls, e.g., multiple steel rolls, in a steel-on-steel (SOS) calendering process, although materials other than steel optionally are used. According to other embodiments, calendering 46 is a compliant-on-steel (COS) process or other process. Calendering 46 of the FIG. 2 embodiment and calendering 18 of the FIG. 1 embodiment optionally are identical processes. Process 20 optionally includes multiple off-line portions like portion 42, to improve magnetic surface smoothness and electromagnetic output level or quality, for example. The coated, calendered substrate is finally wound, at 48, and further processing occurs at 50, for example, incorporation into one or more data cartridges.

Figure 3:
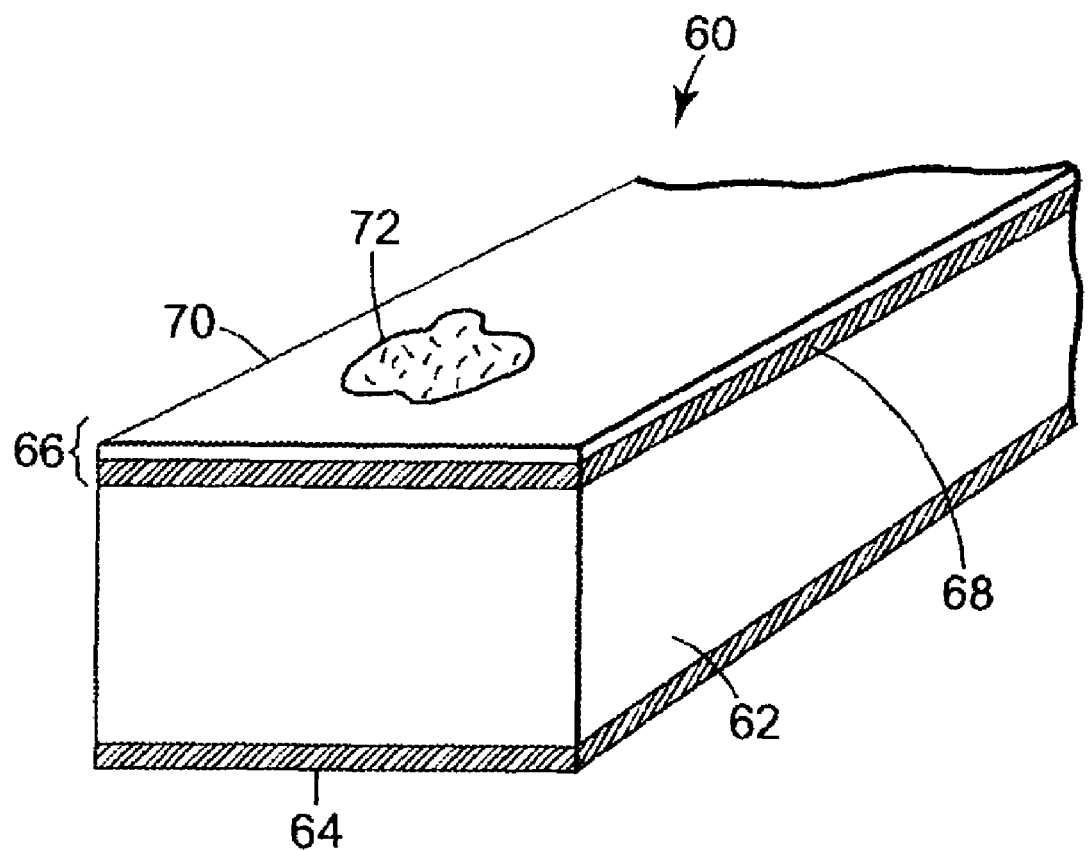
FIG. 3 is a perspective view of a magnetic recording medium, according to an embodiment of the invention.

Embodiments of the invention also extend to a magnetic recording medium, for example, linear open-format magnetic tape or other tape, produced by methods described above. As shown in FIG. 3, for example, magnetic recording medium 60 includes non-magnetic substrate 62, back coat layer or back coat 64, and front coat layer or front coat 66. Front coat 66 optionally includes non-magnetic lower layer 68 and magnetic upper layer 70. Load-bearing particles 72 are maintained generally entirely at the surface of magnetic front coat 66, without being pressed subsurface during calendering or winding. Tribology thus is improved, and fewer load-bearing particles are required to achieve equivalent tribological performance, such that increased magnetic pigment can be used and overall magnetic moment of the magnetic layer increased.

Tables 1-7 below show improvements obtained with the use of heat soaking before off-line calendering, according to embodiments of the invention, instead of heat soaking after off-line calendering. Eight example rolls of magnetic tape were heat soaked and calendered according to the experimental plan set forth in Table 1. For odd-numbered examples, heat-soaking occurred before calendering, and for even-numbered examples, heat soaking occurred after calendering. Film type (PEN being polyethylene naphthalate and PET being polyethylene terephthalate), coated roll length in kilofeet, back coat type (type A being rougher than type B), back coat caliper in microinches, magnetic coating lower layer caliper in microinches, magnetic coating upper layer caliper in microinches, in-line calendering temperature, in-line calendering pressure, pre-heat soak temperature and time (i.e., for heat soaking before calendering), off-line calendering temperature, pressure and line speed, and post-heat soak temperature and time (i.e., for heat soaking after calendering) are shown for each example.

TABLE 1

| Example | Media/Film Type | Coated Roll Length (kft) | BC Type | BC Caliper ($\mu$") | LL Caliper ($\mu$") | UL Coating Caliper ($\mu$") | ILC Temp (° F.) | ILC Press (pli) | Pre-Heat Soak | OLC Temp (° F.) | OLC Press (pli) | OLC Line Speed (fpm) | Post-Heat Soak |
|---|---|---|---|---|---|---|---|---|---|---|---|---|---|
| 1 | LTO/6.0 µm PEN | 11.5 | A | 22 | 80 | 6.5 | 200 | 1920 | 60° C./24 h | 200 | 2383 | 350 | No |
| 2 | LTO/6.0 µm PEN | 11.5 | A | 22 | 80 | 6.5 | 200 | 1920 | No | 200 | 2383 | 350 | 60° C./24 h |
| 3 | LTO/6.0 µm PEN | 12 | A | 22 | 80 | 6.5 | 200 | 1920 | 50° C./48 h | 200 | 2383 | 350 | No |
| 4 | LTO/6.0 µm PEN | 12 | A | 22 | 80 | 6.5 | 200 | 1920 | No | 200 | 2383 | 350 | 50° C./48 h |
| 5 | MP3/6.0 µm PET | 12 | B | 22 | 48 | 3.0 | 200 | 1920 | 50° C./48 h | 200 | 2383 | 350 | No |
| 6 | MP3/6.0 µm PET | 12 | B | 22 | 48 | 3.0 | 200 | 1920 | No | 200 | 2383 | 350 | 50° C./48 h |
| 7 | MP3/6.0 µm PET | 12 | B | 22 | 48 | 3.0 | 200 | 1920 | 50° C./48 h | 200 | 2383 | 350 | No |
| 8 | MP3/6.0 µm PET | 12 | \b | 22 | 48 | 3.0 | 200 | 1920 | No | 200 | 2383 | 350 | 50° C./48 h |

Tables 2-6 show summary results for each of the examples, including Wyko surface roughness, block error rates, reel-to-reel tester magnetics, LTO Gen 1 parametrics, and/or durability performance.

Table 2 shows Wyko values from inside each roll. Heat soak before off-line calendering (Examples 1, 3, 5, and 7) generally reduced surface mean peak-to-valley height $R_z$ of the magnetic front coat, compared to heat soak after off-line calendering of media having similar characteristics (Examples 2, 4, 6, and 8). The reduction was generally in the range of about 14% (Examples 7-8) to about 28% (Examples 1-2). Root mean square roughness $R_q$ did not generally differ across at least paired examples 3-4, 5-6 and 7-8. Skew $R_{sk}$ was negative in Examples 2, 4, 6 and 8, and less negative (Example 1) or slightly positive (Examples 3, 5, and 7) in the corresponding paired examples. Valley or pit depth was significantly different, with lesser depth, as reflected in lesser kurtosis values $R_{ku}$, and less negative or positive $R_{sk}$ values found in Examples 1, 3, 5, and 7. Heat soak before off-line calendering is believed to have reduced embossing of the magnetic front coat by the non-magnetic back coat, and consequently to have reduced valley or pit formation in the magnetic front coat, as described above.

TABLE 2

| Wyko values from inside roll at HS | Example 1 | Example 2 | Example 3 | Example 4 | Example 5 | Example 6 | Example 7 | Example 8 |
|---|---|---|---|---|---|---|---|---|
| Rq | 6.28 | 7.97 | 7.81 | 7.87 | 6.75 | 6.53 | 7.83 | 7.13 |
| Rz | 56.0 | 77.9 | 60.5 | 75.8 | 47.6 | 56.9 | 60.2 | 70.1 |
| Rku | 3.49 | 4.01 | 3.11 | 3.71 | 3.05 | 3.75 | 3.26 | 4.31 |
| Rsk | −0.01 | −0.33 | 0.05 | −0.19 | 0.06 | −0.27 | 0.11 | −0.09 |

As shown in Table 3 below, heat soak before off-line calendering also generally reduced forward and reverse block error rates (BER) (Example 3 vs. Example 4 and Example 7 vs. Example 8). Table 4 below shows differences in reel-to-reel magnetics, Table 5 below shows LTO Gen. 1 Parametrics, and Table 6 below shows durability performance, across examples for which data was obtained.

TABLE 3

| VS160 (PRML Channel) Block Error Rate | Example 3 | Example 4 | Example 7 | Example 8 |
|---|---|---|---|---|
| Forward BER | 1.93E−02 | 2.91E−02 | 3.88E−03 | 7.22E−02 |
| Reverse BER | 5.76E−03 | 9.40E−03 | 4.43E−03 | 7.35E−02 |

Table 7 below shows variations in Wyko surface roughness values for different points in the tape roll or "pancake" of Example 1, (ULTRIUM LTO with heat soak before off-line calendering), and for a comparative in-line-calendered ULTRIUM LTO media jumbo with type "A" back coat and with heat soak after off-line calendering. As shown in Table 7, $R_z$ increased toward the inside of the jumbo, but the same was not true for Example 1. In fact, $R_z$ did not change to a significant extent in Example 1, which indicates lesser pit/valley formation than seen with the jumbo. $R_{vk}$ increased and $R_{sk}$ became negative from outside to inside in the jumbo, but the same was not true from outside to inside in Example 1.

TABLE 4

| Reel-to-Reel magnetics (100 kfci) | Example 1 | Example 2 | Example 3 | Example 4 | Example 5 | Example 6 | Example 7 | Example 8 |
|---|---|---|---|---|---|---|---|---|
| Relative Output | 0.5 | 1.1 | −1.3 | 0.0 | 4.9 | 5.9 | 4.8 | 5.4 |
| Avg. DPSI, 40% Threshold | 16.3 | 28.5 | | | 9.2 | 6.8 | 4.2 | 11.4 |
| Avg. DPSI, 60% Threshold | 6387 | 6183 | | | 91 | 178 | 193 | 606 |

TABLE 5

| LTO Gen1 Parametrics | Example 1 | Example 2 | Example 5 | Example 6 | Example 7 | Example 8 |
|---|---|---|---|---|---|---|
| Rd. SNRsk | −1.2 | −1.6 | 0.8 | 1.1 | 0.4 | 0.3 |
| Rel. Signal | −1.0 | 0.5 | 0.7 | 1.2 | 0.2 | 1.1 |

TABLE 6

| Durability Performance | Example 1 | Example 2 | Example 5 | Example 6 | Example 7 | Example 8 |
|---|---|---|---|---|---|---|
| DLT1 Head Debris Rating: 48 h 104° F./ 80% RH cycling | 1.3 | 2.0 | 2.0 | 2.0 | 3.0 | 2.5 |
| 9940 Drive Head Debris Rating: 300 h Ambient cycling | | 15 (MP2) | 12 | 9 | 7 | 9 |
| LTO Abrasivity (μ" wear) | | | 40.5 | 34.2 | 41.7 | 29.5 |

TABLE 7

| | Ra | Rq | Rz | Rt | Rku | Rsk | RPM | Rpk | RK | Rvk |
|---|---|---|---|---|---|---|---|---|---|---|
| Example 1 | | | | | | | | | | |
| outside | 6.00 | 7.61 | 60.26 | 73.27 | 3.33 | −0.05 | 28.93 | 7.56 | 19.34 | 7.81 |
| middle | 5.00 | 6.35 | 52.73 | 71.42 | 3.36 | 0.01 | 23.92 | 6.53 | 16.04 | 6.78 |
| inside | 4.99 | 6.32 | 55.41 | 81.61 | 3.49 | 0.02 | 25.68 | 6.51 | 16.22 | 6.69 |
| Δ | 1.01 | 1.29 | 4.85 | −8.34 | −0.16 | −0.07 | 3.25 | 1.05 | 3.12 | 1.12 |

TABLE 7-continued

|  | Ra | Rq | Rz | Rt | Rku | Rsk | RPM | Rpk | RK | Rvk |
|---|---|---|---|---|---|---|---|---|---|---|
| Jumbo |  |  |  |  |  |  |  |  |  |  |
| outside | 5.62 | 7.11 | 58.51 | 75.23 | 3.61 | 0.09 | 32.45 | 7.31 | 18.29 | 6.80 |
| inside | 6.64 | 8.55 | 88.77 | 107.08 | 4.37 | −0.48 | 28.10 | 7.14 | 20.99 | 11.08 |
| Δ | −1.02 | −1.44 | −30.26 | −31.85 | −0.76 | 0.57 | 4.35 | 0.17 | −2.70 | −4.28 |

Two additional example rolls, Examples 9 and 10, were heat soaked and calendered according to the experimental plan set forth in Table 8 below. Table 9 below then shows initial, average post-processing air bleed time, initial post-processing magnetic coat roughness $R_q$, wind quality after 15,000 cycles, and air bleed time after 15,000 cycles, for both Examples 9 and 10. Air bleed time is used to measure the surface roughness of a coating, with lower air bleed time generally corresponding to greater roughness.

TABLE 8

| Ex. | Film Type | Coated Roll Length (kft) | BC Type | BC Caliper (μ") | LL Caliper (μ") | UL Coating Caliper (μ") | ILC Temp (° F.) | ILC Press (pli) | Pre-Heat Soak | OLC Temp (° F.) | OLC Press (pli) | OLC Line Speed (fpm) | Post-Heat Soak |
|---|---|---|---|---|---|---|---|---|---|---|---|---|---|
| 9 | 4.5 μm PEN | 12 | C | 30 | 60 | 4.5 | NA | NA | 60° C./ 24 h | 180 | 3105 | 350 | NA |
| 10 | 4.5 μm PEN | 12 | C | 30 | 60 | 4.5 | NA | NA | NA | 180 | 3105 | 350 | 60° C./ 24 h |

TABLE 9

| Example | Initial Average Pancake Backcoat Air Bleed | Initial Magnetic Coat Roughness Rq | 15k-Cycle Wind Quality @150 ips | 15k-Cycle Average Backcoat Air Bleed |
|---|---|---|---|---|
| 9 | 536 sec. | 9.2 nm | Excellent | 1066 sec. |
| 10 | 765 sec. | 8.5 nm | Poor | 1558 sec. |

Heat soak before calendering occurred in Example 9. Heat soak after calendering occurred in Example 10. As shown in Table 9, the Example 9 roll exhibited lower post-processing average air bleed than the Example 10 roll, while maintaining an acceptable magnetic coat roughness $R_q$. In other words, for virgin tape, the roll undergoing heat curing before calendering exhibited lower average air bleed of the non-magnetic back coat, without causing unacceptable roughness in the magnetic front coat.

Cartridges were then produced using the Example 9 and Example 10 tape. Selected cartridges were cycled for 15,000 passes, as will be described, to simulate performance throughout the life of the cartridge. As indicated in Table 9, 15k-cycled average air bleed still was lower for Example 9, and wind quality was much better. More specifically, at 150 inches-per-second, 0 of 3 cartridges exhibited wind defects in Example 9, whereas 3 of 3 cartridges exhibited wind defects in Example 10.

Figure 4:
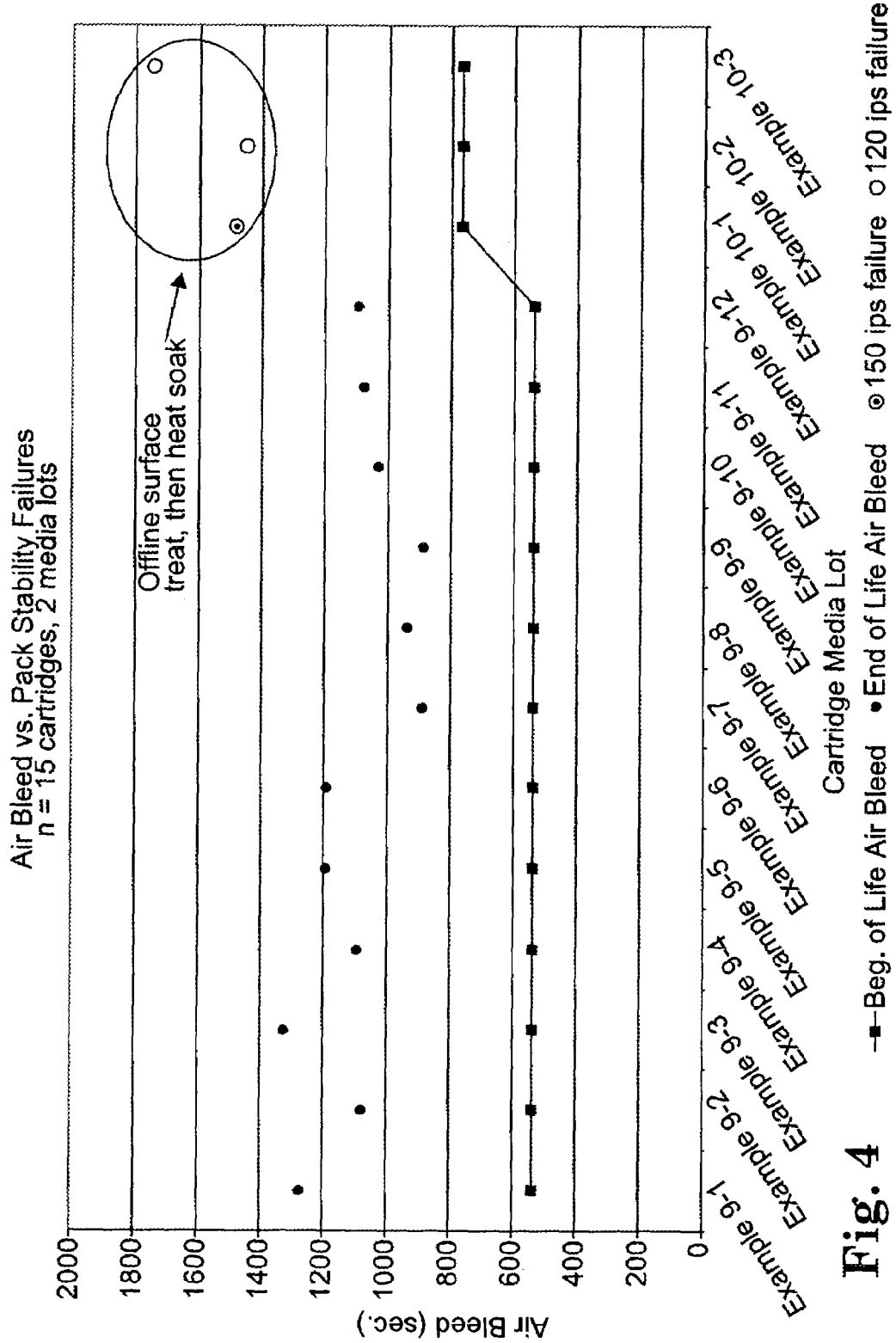
FIG. 4 is a plot of cartridge media lots versus air bleed in seconds, according to an embodiment of the invention.

With reference to FIG. 4, cartridges 9-1 through 9-12 were built from the roll of Example 9, and cartridges 10-1 through 10-3 were built from the roll of Example 10. Cartridges 9-1 through 9-9 were cycled through 5,000 passes, and cartridges 9-10 through 9-12 and 10-1 through 10-3 were cycled through 15,000 passes. Beginning-of-life and end-of-life air bleed values for all cartridges are illustrated. As shown, the cycled cartridges from Example 9, in which the tape was heat soaked prior to calendering, exhibited lower beginning-of-life and end-of-life back coat air bleed relative to cartridges from Example 10, in which the tape was heat soaked after calendering. Heat curing prior to calendering is believed to cause air bleed and wind quality improvements not only for virgin tape, but also over the entire life of an associated cartridge.

Embodiments of the invention apply to a wide variety of magnetic recording media and methods of making such media, such as magnetic tape in LTO format, DLT format, and other formats. Although embodiments of the invention are particularly applicable to magnetic tape and have been described accordingly, the invention should not be considered limited to magnetic tape. Other types of magnetic recording media, e.g., magnetic disks, also are contemplated according to the invention in its various embodiments.

Although specific embodiments have been illustrated and described herein for purposes of description, it will be appreciated by those of ordinary skill in the art that a wide variety of alternate and/or equivalent implementations calculated to achieve similar purposes may be substituted for the specific embodiments shown and described, without departing from the scope of the present invention. For example, calendering, as described herein, optionally includes one-nip calendering or multiple-nip calendering in the same calendering pass; one in-line or off-line calendering pass optionally includes one, two, three or more nips or nip stations. Different calendering speeds are contemplated for the calendering processes described herein, e.g., about 700 feet per minute, about 350 feet per minute, about 200 feet per minute, or other speeds. Processes or process steps defined herein need not occur in the exact order stated, but optionally occur in other orders or sequences. Pounds per linear inch (pli) values, as described herein, are taken relative to the width across the substrate or calendering nip, such that the values are scalable to a coating line of any given width, for example. Those with skill in the chemical, mechanical, electromechanical, electrical, or computer arts will readily appreciate that the present invention may be implemented in a very wide variety of embodiments. This application is intended to cover any adaptations or variations of the embodiments discussed herein.

What is claimed is:

1. A method for producing a magnetic recording medium, comprising:
   winding a coated substrate into a roll to form a wound roll of coated substrate;
   heat-curing the wound roll of coated substrate to cure a non-magnetic back coat on the substrate and to cure a magnetic front coat on the substrate; and
   calendering the heat-cured coated substrate to produce the magnetic recording medium.

2. The method of claim 1, wherein the heat-curing comprises heat soaking the wound roll of coated substrate.

3. The method of claim 2, wherein the heat soaking comprises immersing the wound roll of coated substrate at an immersion temperature in the range of about 50° C. to about 60° C.

4. The method of claim 1, further comprising drying the non-magnetic back coat and the magnetic front coat before the heat-curing.

5. The method of claim 1, wherein the calendering occurs at a calendering temperature of between about 80° C. and about 95° C.

6. The method of claim 1, wherein the calendering comprises passing the substrate between opposed, generally non-compliant rolls.

7. The method of claim 6, further comprising calendering the substrate between additional opposed rolls, at least one of the additional opposed rolls being generally compliant.

8. The method of claim 1, wherein the calendering comprises off-line calendering.

9. The method of claim 8, further comprising in-line calendering, using at least one generally compliant roll, prior to the heat-curing.

10. The method of claim 1, wherein the heat-curing before calendering generally eliminates or generally reduces embossing of the magnetic front coat by the non-magnetic back coat.

11. The method of claim 1, wherein the heat-curing before calendering generally reduces a block error rate of the magnetic recording medium.

12. The method of claim 1, wherein the heat-curing before calendering generally reduces surface mean peak-to-valley height $R_z$ of the magnetic front coat.

13. The method of claim 1, wherein the heat-curing before calendering generally reduces the amount of negative skew $R_{sk}$ of the magnetic front coat.

14. The method of claim 1, wherein the heat-curing before calendering generally reduces air bleed of the non-magnetic back coat.

15. The method of claim 1, wherein heat-curing before calendering generally improves wind quality of the magnetic recording medium.

16. A method for producing a magnetic recording medium, comprising:
   winding a coated substrate into a roll to form a wound roll of coated substrate;
   heating the wound roll of coated substrate to cure a non-magnetic back coat on the substrate and to cure a magnetic front coat on the substrate; and
   calendering the cured coated substrate to produce the magnetic recording medium.

17. The method of claim 16, wherein the beating comprises heat soaking the wound roll of coated substrate.

18. The method of claim 17, wherein the heat soaking comprises immersing the wound roll of coated substrate at an immersion temperature in the range of about 50° C. to about 60° C.

* * * * *